(12) United States Patent
Harmon et al.

(10) Patent No.: US 7,867,398 B2
(45) Date of Patent: Jan. 11, 2011

(54) METHOD TO REDUCE WASTEWATER TREATMENT PLANT FOOTPRINTS AND COSTS

(75) Inventors: John Harmon, Bakersfield, CA (US); Marcus G. Theodore, Salt Lake City, UT (US); Larry P. Wardle, Bountiful, UT (US)

(73) Assignee: Earth Renaissance Technologies, LLC, Salt Lake City, UT (US)

( * ) Notice: Subject to any disclaimer, the term of this patent is extended or adjusted under 35 U.S.C. 154(b) by 0 days.

(21) Appl. No.: 12/798,088

(22) Filed: Mar. 30, 2010

(65) Prior Publication Data

US 2010/0193429 A1    Aug. 5, 2010

Related U.S. Application Data

(63) Continuation-in-part of application No. 12/456,387, filed on Jun. 16, 2009, which is a continuation-in-part of application No. 11/438,247, filed on May 22, 2006, now Pat. No. 7,563,372.

(60) Provisional application No. 60/684,392, filed on May 25, 2005.

(51) Int. Cl.
*C02F 3/00* (2006.01)

(52) U.S. Cl. ................ 210/604; 210/743; 210/192; 210/220; 210/764

(58) Field of Classification Search .......... 210/604, 210/743, 192, 220, 764
See application file for complete search history.

(56) References Cited

U.S. PATENT DOCUMENTS

| 4,304,673 | A  | 12/1981 | Reynolds et al. |
| 4,340,489 | A  | 7/1982  | Adams et al. |
| 4,765,911 | A  | 8/1988  | Rasmussen |
| 5,906,750 | A  | 5/1999  | Haase |
| 7,416,668 | B1 | 8/2008  | Theodore |
| 7,429,329 | B2 | 9/2008  | Theodore |
| 7,455,773 | B1 | 11/2008 | Harmon et al. |
| 7,563,372 | B1 | 7/2009  | Theodore |
| 7,566,400 | B2 | 7/2009  | Harmon et al. |

OTHER PUBLICATIONS

United Nations Environmental Programme Division of Technology, Industry, and Economics Newsletter and Technical Publications Freshwater Management Series No. 1, Bio-solids Man.
The 13th Element, John Wiley & Sons, Inc., New York, 2000 Chapter "Oh Shit", pp. 271-273.
Phosphorous: "From urine to fire" by Peter E. Childs; http://www.ul.ie/-CnA/Issue 63/ToC27 Phosphorous.httm.
Wikepaedia, Algae Fuels, Http://en.wikipedia.org/Algae_fuel.
Diego Rosso et al, Comparative Energy and Carbon Footprints for Activated Sludge Layouts, 2008 Water Environ. Fed. Sustain. 2008.

*Primary Examiner*—Chester T Barry
(74) *Attorney, Agent, or Firm*—Marcus G. Theodore (57) ABSTRACT

A method and apparatus for reducing the footprint of chemical/mechanical/biological wastewater treatment facilities employing sulfur dioxide disinfection and chemical dewatering of solids in conjunction with an environmental biological systems for treating the separated treated wastewater.

1 Claim, 3 Drawing Sheets

METHOD TO REDUCE WASTEWATER TREATMENT PLANT FOOTPRINTS AND COSTS

RELATED APPLICATIONS

This application is a continuation-in-part of prior application Ser. No. 12/456,387 filed Jun. 16, 2009 entitled "Wastewater Treatment Apparatus, which is a continuation-in-part of prior application Ser. No. 11/438,247 filed May 22, 2006 now U.S. Pat. No. 7,563,372 entitled "Package Dewatering Wastewater Treatment Method, and claims the benefit of U.S. Provisional Application No. 60/684,392, filed May 25, 2005.

BACKGROUND OF THE INVENTION

1. Field

This invention comprises a method and apparatus to reduce the wastewater treatment plant footprint of facilities employing rapid sludge chemical dewatering technology to produce a disinfected treated recovered wastewater.

2. State of the Art

Various sewage treatment methods and plants are known. Most large municipal systems employ a series of settling ponds sequentially concentrating the solids contained in wastewater either with or without polymers for separation from liquids via mechanical separation means, such as belt presses. To produce a clean effluent that can be safely discharged to watercourses, wastewater treatment operations use three or four distinct stages of treatment to remove harmful contaminants; according to the United Nations Environmental Programme Division of Technology, Industry, and Economics Newsletter and Technical Publications Freshwater Management Series No. 1, "*Bio-solids Management: An Environmentally Sound Approach for Managing Sewage Treatment Plant Sludge*" stating: "Each of these stages mimics and accelerates processes that occur in nature.

Preliminary wastewater treatment usually involves gravity sedimentation of screened wastewater to remove settled solids. Half of the solids suspended in wastewater are removed through primary treatment. The residual material from this process is a concentrated suspension called primary sludge, subsequently undergoing additional treatment to become bio-solids.

Secondary wastewater treatment is accomplished through a biological process, removing biodegradable material. This treatment process uses microorganisms to consume dissolved and suspended organic matter, producing carbon dioxide and other by-products. The organic matter benefits by providing nutrients needed to sustain the communities of microorganisms. As microorganisms feed, their density increases and they settle to the bottom of processing tanks, separated from the clarified water as a concentrated suspension called secondary sludge, biological sludge, waste activated sludge, or trickling filter humus.

Tertiary or advanced treatment is used when extremely high-quality effluent is required, including direct discharge to a drinking water source. The solid residual collected through tertiary treatment consists mainly of chemicals added to clean the final effluent, which are reclaimed before discharge, and therefore not incorporated into bio-solids. Tertiary or advanced treatment does not reduce the treated wastewater brine content, requiring energy intensive Quaternary brine treatment removal using reverse osmosis and distillation, and other methods.

Combined primary and secondary solids comprise the majority of material used at municipal plants for bio-solids production. Careful management throughout the entire treatment process allows plant operators to control the solids content, nutrient value and other constituents of bio-solids.

The Municipal Sludge-to-Bio-Solids Treatment Process

Three important factors must be addressed through further processing before this material can be utilized: (1) pathogen levels, (2) presence of potentially harmful industrial contaminants, and pharmaceuticals and personal care products, and (3) water content.

The principal process employed to convert municipal sludge into bio-solids is called stabilization. Stabilization accelerates the biodegradation of organic compounds, reduces the microbial population including pathogens, and renders the material microbiologically safe for agricultural use. Biological stabilization uses aerobic or anaerobic treatment to reduce the organic content of solids through controlled biodegradation. Chemical stabilization does not reduce the quantity of biodegradable organic matter in solids, but creates process conditions inhibiting microorganisms, thereby slowing the degradation of organic materials and reducing odors. The most common chemical stabilization procedure is to elevate the pH level of the solids using lime or other alkaline materials. Thermal drying and composting can be used to stabilize bio-solids. Full pasteurization of bio-solids is not needed when the primary use is cropland application. Any potential risk to human health due to exposure to pathogens is eliminated through proper application procedures and in-situ microbial decomposition.

The presence of contaminants in the sludge or bio-solids arising from industrial discharges is a more challenging problem and may be the deciding factor in determining the choice of a utilization disposal option. Put simply, many industries have habitually used the sewer system as a convenient and low-cost way to discharge hazardous wastes. The contaminants accumulate in the biomass and sludge, and can render the material unfit for any beneficial use. The most common options used for disposal of this contaminated material are landfill or incinerations. The cost is usually borne by the municipality rather than the hazardous waste generator. Bio-solids utilization is a good, environmentally sustainable option when the wastewater is from municipal sources only, or when a fully enforced industrial pre-treatment and discharge control system is in place. The decision to select an environmentally sustainable approach to bio-solids management can be used very effectively to review and correct polluting practices up-stream that should not be taking place.

The final concern is the water content of the bio-solids product. Primary and secondary sludge generally contain no more than four percent solids, and the storage and transportation costs of this semi-liquid material limit the application to nearby farmland. Processes to remove water from solids, therefore, are common in bio-solids production. The simplest method for removing water is gravity thickening, involving concentration by simple sedimentation. Allowing sufficient time for solids to settle in tanks can increase suspended solids concentration to five or six percent. Thickening can include flotation processes, gravity drainage belts, perforated rotating drums, and centrifuges. Nothing is added to bio-solids during the gravity thickening processes.

Dewatering is another standard method of water removal in bio-solids production. Simple dewatering involves containment of wastewater solids in drying beds or lagoons, where gravity, drainage, and evaporation remove moisture. More often, dewatering involves mechanical equipment including filter presses, vacuum filters, and centrifuges. Mechanically dewatered solids typically contain between 20% and 45% solids. Finally, drying processes can be used to remove even larger volumes of water from bio-solids. Thermal drying with direct or indirect dryers followed by polarization can remove virtually all water and stabilize bio-solids to the point of full compliance with any regulatory requirement. This method is used where a viable commercial market exists for the pelletized product.

Thus a particular wastewater treatment facility design is highly dependent upon the wastewater inflows and sludge composition and the discharge and treatment permitting restrictions and plant objectives. Oftentimes these plant designs employ thermophilic and other digestion processes to decompose the sludge as part of the separation process. For example, Haase, U.S. Pat. No. 5,906,750 issued May 25, 1999 discloses a method for dewatering of sludge previously digested by a thermophilic digestion process employing polymers. The polymers are extremely hydrophilic as they agglomerate fine particles for separation from the wastewater in the belt presses. This gelatinous mechanically separated mass is then usually land filled or admixed with other fuels for burning, and may contain significant pathogens and heavy metals. Once deposited and covered, these landfills do not breakdown rapidly. They comprise large deposits of unstable gelatinous soil, which acts as a breeding ground for pathogens. If these separated solids are treated with chlorine for pathogen kill, chlorinated carcinogens often result, creating a different environmental hazard.

The mechanically separated gray water by-product is usually not treated and is then used for agricultural application, or dumped into a body of water for dilution. If treated with chlorine to kill pathogens before land application or dumping, its usage for agricultural purposes is less than ideal as any residual chlorine acts as an herbicide.

In addition, mechanical sludge separation typically requires a large series of settling ponds with wastewater residence times therein typically from 24 to 48 hours, depending upon the weather and nature of the sludge processed. Typically, landfill and polymer costs represent approximately 30 percent of wastewater treatment costs. This long dwell time results in further concentrations of the brines.

Other mechanical filtration methods provide sludge separation, but require continual unplugging of the filters; generating significant ongoing costs of filter replacement and declining effectiveness as the filter becomes plugged with the separated solids.

As long as a mechanical sewage separation plant does not have to be moved and operates within its environmental discharge and landfill permit constraints, it can be used as a low operating and maintenance cost effective sewage disposal method. However, it is a technique requiring significant upfront capital investment, a large dewatering footprint, and may result in long term environmental clean-up and remediation costs. As urban populations being served grow and landfill costs increase, these plants seldom meet permitting constraints without significant upgrades in design, particularly with respect to pathogen gray water discharge and the negative impacts caused by mountains of gelatinous solids.

Other chemical wastewater treatment methods employ chemical agglomeration and disposal methods, such as Adams et al., U.S. Pat. No. 4,340,489 issued Jul. 20, 1982 wherein wastewater is treated with sufficient sulfurous acid to effectuate disinfection—usually approximately 5 to 100 mg/L free $SO_2$ at pH 2.

Polymers and other separation methods are then employed to remove the solids. Reynolds et. al., U.S. Pat. No. 4,304,673 issued Dec. 08, 1981 is another wastewater treatment process employing chemicals to disinfect sewage sludge continuously in a similar manner as Adams et al. Rasmussen, U.S. Pat. No. 4,765,911 issued Aug. 23, 1988 is another two-stage chemical treatment process for treating aerobic or anaerobic sewage sludge. These chemical wastewater treatment methods are not package systems, not moveable as needed to accommodate the needs of a community, particularly in riparian areas subject to flooding, rely heavily on the use of polymers, and they do not address the issues of BOD's and ammonia in treated wastewater or brine disposal methods.

Theodore, U.S. Pat. No. 7,416,668 issued Aug. 26, 2008 discloses a wastewater chemical/biological treatment plant recovery apparatus and method employing sulfur dioxide for disinfection. Harmon et al., U.S. Pat. No. 7,455,773 issued Nov. 25, 2008 also employs sulfur dioxide for disinfection and dewatering and lime for pH adjustment. Theodore, U.S. Pat. No. 7,429,329 issued Sep. 30, 2008 also sulfur dioxide for chemical and mechanical dewatering. Theodore, U.S. Pat. No. 7,563,372 issued Jul. 21, 2009 discloses a package dewatering wastewater treatment method employing sulfur dioxide chemical dewatering in conjunction with mechanical agglomeration and disposal methods. Harmon et al., U.S. Pat. No. 7,566,400 issued Jul. 28, 2009 also employs sulfur dioxide as part of a chemical/biological treatment method and apparatus. These patents held by Earth Renaissance Technologies, Inc. use large concentrations of sulfur dioxide for rapid disinfection where it is desirable to reduce the dwell time to reduce tankage sizing and treatment plant footprint. This smaller footprint design then requires large amounts of lime or other chemicals for pH adjustment to neutralize excess sulfur dioxide; thereby increasing operating costs. Alternatively, lower concentrations of sulfur dioxide can be used with larger tanks to provide longer dwell times, thus increasing the treatment plant's capital costs and footprint, but lowering the amount of lime or other chemicals for pH adjustment and sulfur dioxide neutralization.

Thus, there remains a need for a method and apparatus to reduce the amount of sulfur dioxide for chemical rapid dewatering and disinfection and still provide a small treatment plant footprint that can easily retrofitted into existing wastewater treatment facilities to treat chemically and recover wastewater solids and liquids for subsequent environmental biological usage and polishing. The method and apparatus described below provides such an invention.

SUMMARY OF THE INVENTION

The present invention comprises a method and apparatus to reduce the footprint of wastewater treatment plants employing sulfur dioxide chemical dewatering and disinfection technology to separate the solids from the wastewater to provide recovered treated wastewater for reuse. Footprint as used herein not only refers to the size of the physical layout of the wastewater treatment plant employing sulfur dioxide, but the carbon footprint reduction, which results from rapid disinfection and inactivation of bacteria and viruses, which produce green house gases (methane, carbon dioxide, and nitrous oxides) from the breakdown of wastewater treatment solids. Wastewater, as used herein, is principally directed to domestic sewage from dwellings, business buildings, institutions, containing ground water, surface water, and/or storm water, and can include wastewater, having already undergone primary and secondary treatment according to conventional treatment processes. However, if the method is employed primarily as a primary treatment process, it can additionally be used to address other industrial, farming, and agricultural wastes requiring the same conditioning, disinfection, and deodorizing needs.

Method

The method comprises chemically treating the wastewater containing solids by supersaturating it with an excess of sulfur dioxide to rapidly condition and disinfect the wastewater containing solids and separate the solids in an enclosed container to prevent operator exposure. Both the wastewater solid and liquid fractions are injected with an excess amount of sulfur dioxide, which forms sulfurous acid, ($H_2SO_3$), and dissociates to produce $H^+$, bi-sulfite ($HSO_3^-$), sulfite ($SO_3^=$), and free $SO_2$ species in solution, all hereinafter all referred to as sulfurous acid. The high levels of free $SO_2$ in the wastewater and the atmosphere above it are maintained within an enclosed container at a pressure and level selected to raise the levels of free $SO_2$ in solution to rapidly disinfect the wastewater and solids; thereby reducing the dwell time and size of vessels required to hold the treated wastewater for disinfection. For example, disinfection at a pH of approximately 2 with high levels of free $SO_2$ takes between 10 and 15 minutes, whereas disinfection at 3.5 with lesser levels of free $SO_2$ takes approximately 4 hours, depending upon the alkalinity of the wastewater. The size of vessel for 10 to 15 minute dwell time for disinfection is 1/16 the size of that required for 4 hour dwell time disinfection. Thus, typically, the $SO_2$ is injected at the level required for disinfection (up to 500 mg/L free SO2 at pH 2, where viruses must be inactivated according to Sulfur dioxide treatment of wastewater also has some effect on viruses; see "Sulfur Dioxide treatment of secondary sewage—Effect on viruses" by V. Dean Adams, Science Direct-Environment International published 8 Dec. 1999; htt;://www.sciencedirect.com/science?ob=ArticleURL&_udi=B6V7 . . . wherein Reovirus (PIV or IV) was inactivated with $SO_2$ treatment by 90% and Poliovirus in wastewater was inactivated by 907% with a 500 mg/L $SO_2$ treatment) into the wastewater under positive pressure in smaller treatment vessels to insure even higher levels of saturation. At these high saturation levels, disinfection is rapidly achieved. However, excess $SO_2$ will volatilize out of solution if exposed to the atmosphere. Consequently, this excess $SO_2$ must be removed or chemically inactivated before exposure to the atmosphere. The present invention injects high levels of $SO_2$ into wastewater in an enclosed reaction chamber for rapid disinfection and then is rapidly withdrawn after disinfection for reuse with negative vacuum pressure as described below for removal and re-injection. By rapidly removing the excess $SO_2$, the levels of $SO_2$ in the treated effluent are reduced so the amount of lime to adjust the pH is also reduced. Also, as the excess $SO_2$ is reused the amount of sulfur to create $SO_2$ is reduced thereby reducing the overall costs of operation.

Conditioning of the solids to chemically dewater occurs as part of the $SO_2$ treatment. Conditioning is defined as treating the filtered solids with sufficient $SO_2$ ensuring they will chemically dewater when allowed to drain, forming a fairly dry solid with a BTU content approximating wood chips or shavings. Conditioning of the solids generally results in a color change of the solids from a dark brown to a lighter gray brown color. Similarly, the $SO_2$ treated liquid fraction generally changes from a greenish color to a lighter gray brown colloidal suspension color. The malodorous smell of the raw wastewater is concomitantly replaced by a slight acidic smell. Consequently, the conditioning point can easily be determined by injecting more and more $SO_2$ into the wastewater until the color and odor changes occur—usually observed at a pH of approximately between 1.5 and 3.5, depending upon dwell time. If the color changes are too faint, the pH can be measured instead.

Sulfur dioxide has lone electron pairs, allowing it to act as a Lewis base. Additionally it can act as a Lewis acid. The dissolved $SO_2$ gaseous content varies with temperature. For example, the grams/liter of dissolved sulfur dioxide in water at 20 degrees C. is 106.4 gm/L. It is 55.4 gm/L at 40 degrees. It is 32.5 gm/L at 60 degrees, and 21.3 gm/L at 80 degrees. Consequently, this supersaturated sulfurous acid treated wastewater system with free $SO_2$/sulfurous acid/bi-sulfite/sulfite present in solution at a low pH forms a complex liquid/gas/solid phase chemistry system where reactions are difficult to describe and quantify exactly, but the above sulfurous acid wastewater conditioning endpoints are distinct. The conditioning of the wastewater and solids via oxidation/reduction reactions thus forms self adhering solids, shedding water upon drying, and disinfected wastewater with high plant and aquatic photo biomass nutrients at the point where the odor reduction and color changes of the conditioned solids and liquids occur. These disinfected dried solids do not emit significant amounts green house gases as is the case with conventional gelatinous solids, which are not disinfected.

After sulfur dioxide treatment effectuates disinfection, the surplus free $SO_2$ is removed by applying negative pressure with a vacuum (typically 4 psi or greater) to collect it for re-injection into the intake wastewater; thereby reducing the amount of additional sulfur dioxide required to supersaturate the wastewater for rapid disinfection. Vacuum removal results in approximately 70% of the unreacted excess free $SO_2$ collected for re-injection into entering wastewater streams. Thus, there is initially a significant amount of sulfur dioxide initially required to achieve super saturation, but thereafter the collected excess unreacted $SO_2$ is re-injected to reduce the total amount of ongoing additional $SO_2$ required for super saturation. This is usually accomplished by initially using a larger capacity sulfurous acid generator to supersaturate the incoming wastewater entering enclosed contact vessels, and then using a smaller capacity sulfurous acid generator to supplement the vacuum collected unreacted free $SO_2$ for injection into entering wastewater inflow streams to maintain super saturation disinfection conditions. Dual sulfur generators also provide system redundancy in the event of a sulfur generator outage. It also provides standby capacity to handle storm wastewater surges where both generators could be employed, with the surplus directed to other standby tankage.

The chemically separated solids and the resultant chemically treated wastewater are then disposed of consistent with applicable discharge permits. Usually, this requires the inactivation of the free $SO_2$ in the treated wastewater with an alkaline base, such as hydrated or anhydrous lime [Ca (OH)$_2$ or CaO] or spent lime [CaCO$_3$] until the required discharge pH is acquired. Use of calcium salts provides a double charged cation, which overcomes sodium ion salinity problems by adjusting the SAR ratio. Also, spent lime is a waste product from sugar beet processing and is therefore abundant and cheap. It also generates $CO_2$ when neutralizing the sulfurous acid, which aids in the growth of certain aquatic crops, such as algae. If crops or photo biomass is not to be grown to offset the release of $CO_2$ from spent lime, hydrated or anhydrous lime is used to reduce the carbon footprint.

The neutralization chemicals used for sulfurous acid chemical dewatering are anhydrous or hydrous sulfur dioxide, which provide rapid water/solids separation. To minimize operator exposure to sulfur dioxide, preferably sulfurous acid generators are employed to generate from sulfur the sulfurous acid as needed. Sulfur dioxide chemical dewatering generates self-agglomerating solids, which can be more readily separated from the liquid fraction via conventional screens or drying beds without the need for polymers. Sulfur dioxide dissolves readily in water requiring little mixing. Disinfected sulfur dioxide separation of wastewater and dewatering of the resultant solids typically takes 10 minutes to an hour compared to 24 to 48 hours with present mechanical concentrators. Lesser amounts of the sulfur dioxide chemicals are required if solids/liquids separation is only required, rather than total disinfection. The dwell time required is dependent upon the alkalinity of the wastewater. The porosity of the separation equipment screens sand filters or separation drain bags employed are selected based on the end user requirements. Generally, it is easier to move the solids in a 1 to 3% slurry, so the $SO_2$ is injected into the wastewater and held a minimal time in a pipeline or dwell tank to effectuate an initial separation where the solids reach the minimal particle size to collect in an equipment filter screen, sand filter, or drain bag. The solids then further dewater more completely by settling or separation within the equipment screens, filters or separation bags. For those sludges, which may require initial agglomeration assistance, acid resistant polymers, such as cationic copolymers of acrylamide with a cationic monomer, or cationically modified acrylamide or polyamine, may be employed and added to the sulfurous acidified wastewater. Other polyquaternary amines, which are pH insensitive and function well over a broad pH, may also be employed.

Because of the fast reaction time, the size of the treatment vessels and drain bags are materially less so land usage is minimized. Chemically treated wastewater methods therefore provide greater flexibility in equipment separation designs, which result in further cost savings. Nor is there usually any need for adding polymers to most wastewaters to agglomerate first the solids as is the case with conventional belt presses and centrifugal or mechanical separators used in conventional mechanical sewage treatment plants providing additional cost savings.

Solids disposal and handling costs are also reduced. Sulfur dioxide batch treatment generates an initial separated solid having a water content of 30% to 40% in approximately 5 to 10 minutes, depending on composition. These solids, after separation, are then allowed to continue to chemically dewater until a solids composition having water content as low as 1 to 4% is effectuated. If the chemical exposure is extended to approximately 20 minutes to insure disinfection, odor and green house gas generation during the remainder of the treatment and disposal process is minimized as discussed in more detail below. Sulfur dioxide also acid leaches the heavy metals into the liquid fraction for ease of removal via the subsequent addition of lime.

This rapid sulfur dioxide injection and separation generating self-agglomerating solids and heavy metals in the liquid fraction enables the use of much smaller gas injection and separation equipment than conventional mechanical dewatering systems. The sulfur dioxide dewatering equipment can be installed in modules, as needed. Thus, sulfur dioxide dewatering requires lower capital equipment cost investment, and has comparable or somewhat higher handling costs.

One mobile equipment design uses a sulfurous acid generator to inject sulfur dioxide into the raw wastewater plant inflows having a low solids concentration of approximately 1% until odor suppression results and the initial solids are conditioned for separation. Usually this occurs at a pH of approximately 2 or lower. At this point, wastewater odors are eliminated, bacteria producing greenhouse gases (methane, CO2, and NO) are inactivated, and the solids change color from a dark brown to a light grey and are more fibrous. These conditioned solids are then separated by passing them through the pores of a woven polymer bag placed on a drain pad, whose weave porosity is selected for rapid draining of excess water from the solids. The sulfur dioxide-treated wastewater is thus rapidly pumped directly into the woven polymer bag where the remaining chemical dewatering occurs without the need for further drying or treatment. The treated separated water is then collected on a drain pad and land applied in alkaline soil areas, or further treated with an alkaline reagent, such as lime for heavy metals removal or pH adjustment to meet permit discharge requirements.

Anhydrous and hydrous sulfur dioxides are strong disinfectants. When employed, they disinfect both the liquids and solids fractions to provide liquid handling and solids storage without the emissions of odors. The disinfected recovered wastewater therefore does not have viable competing organisms when used for growing aquatic plants, such as duckweed, algae, etc. Sulfur dioxide is relatively cheap and readily available. It may also be generated on-site from the burning of raw sulfur; particularly if additional heat from sulfur burning is required for solids process drying or accelerating other treatment processes. Sulfur dioxide is extremely hydrophilic and forms sulfurous acid on contact with water. Injection until an elevated pH of approximately 2 with free $SO_2$ of 15 mg/L for approximately 30 minutes results in complete disinfection; see Adams et al., U.S. Pat. No. 4,340,489.

For batch separation, after approximately one half hour the sulfur dioxide-treated conditioned solids have a moisture content of 30% to 40% and continue to shed water on a drying venue for approximately 24 hours, ultimately reaching the consistency and dryness of wood with a 1 to 4 percent by weight water content. This dried product may then be land filled, burned, or gasified in a manner consistent with the treatment plant unit processes and/or permit constraints.

The rapid disinfection chemical/mechanical/biological dewatering sewage treatment method and apparatus is sized and expanded as needed and thus avoids the carrying costs of conventional mechanically concentrated systems constructed with excess capacity to meet projected future wastewater treatment needs. Chemical dewatering equipment has a much lower installation cost, which can be leased or installed as needed on a pay as you go basis. For example, instead of the $26,500,000 price for a typical 10 MGD conventional plant to provide economies of scale to process and additional 1 MGD wastewater stream, an under $1,000,000 modular unit may be added to the existing footprint to provide a 0.5 to 1 MGD hybrid chemical dewatering system. Additional 0.5 to 1 MGD modules may then be added and installed as needed. The concentrated solids are then disposed of in accordance with permitting requirements. For example, for those retrofitted plants land filling treated solids, such as the Central Valley Water Reclamation Facility in Salt Lake City, Utah, after installation the solids generated from the package dewatering equipment also landfills these treated solids for disposal. The water content of the Central Valley Water Reclamation Facility's mechanically separated solids is typically 40% by weight. Employing instead the package dewatering system method results in treated solids having a 4% by weight composition, results in a net 36% by weight savings. The more concentrated sulfur dioxide dewatered solids should therefore reduce the present plant disposal costs of approximately $32.00/ton by about 36%. In addition, the reduced volume of treated solids extends the life of the present landfill facility by requiring less space to dispose of these more concentrated solids. Other savings from chemical dewatering result from avoiding the costs of polymers employed in more expensive conventional treatment plants, which typically average 9 pounds per ton of processed sludge as well as the reduced use of its belt presses. Off-setting these cost savings are the added costs of sulfur dioxide.

The amount of $SO_2$ is dependent upon the alkalinity and bicarbonates of the wastewater inflows, which generally is no more than 800 mg/liter (Standard Methods, 14$^{th}$ Ed. APHA, 1975); see Reynolds, U.S. Pat. No. 4,304,673. Reynolds found that generally no more than 2000, and preferably no more than about 600 mg of $SO_2$ per liter of wastewater was required.

Using 1 liter equals 0.2641721 gallons and 1 mg=$\frac{1}{1000}$gr., 1 gr.=2.204623×10-3 pounds; for a 0.5 MGD plant this equals:

0.5×1,000,000 gallons/day×1 liter/0.2641721 gallons× 2000 mg/liter×1 gr/1000 mg×0.26417212 gallons/liter× 2.204623×10-3 pounds/gram=2,204.6229 pounds/day or approximately 1 ton of sulfur dioxide under a worst case alkalinity scenario. It is expected that the 600 mg of $SO_2$ per liter is more realistic for most wastewaters, reducing the chemical treatment tonnage required by one third. Current pricing in dollars per ton of liquid bulk f.o.b. works currently is around $230/ton so that the chemical dewatering cost is relatively nominal. This sulfur dioxide may be delivered to the site in tanks, or generated on site via sulfur burners. Sulfur burners are relatively efficient and have the additional benefit of generating considerable heat from sulfur burning, which can be used to supply heat to the treatment plants drying beds.

In areas where eutrophication is a problem, the acid leached heavy metals stripped from the solids can be removed from the treated wastewater stream via the addition of CaO or hydrated lime before discharge into a stream or lake. This not only precipitates the heavy metals as metal hydroxides, but some insoluble calcium phosphates and sulfates. These precipitates may be removed via filtration and sold or land filled.

For cost comparison, the package sulfur dioxide chemical/mechanical/biological dewatering sewage treatment method may also be adapted to generate added revenues from the gasification or burning of the concentrated high Btu solids for production of heat or electricity. In addition, there are added revenues from chemically demetalized and disinfected water sales, harvested crops and algae raised with the recovered treated wastewater, and possible carbon credits from $CO_2$ absorbed by plants, algae, and aqueous vegetation. Additional carbon credits may result from shutting down solids nitrification/denitrification digesters and sequential batch reactors, which reduce nitrates, but also produce large amounts of green house gases.

The rapid disinfection sulfur dioxide chemical/mechanical/biological dewatering sewage treatment method may also receive revenues from soil conditioning services associated with the land application of the acidified sulfur treated wastewater. This is particularly important in alkaline soil regions where the additions of acids to soils is routinely required, thus providing an additional potential revenue stream to be factored in against the plant costs. $SO_2$ water conditioning also may be blended with the chlorine treated discharge from a conventional wastewater treatment plant to remove chlorine before land application.

In summary, the above method reduces the footprint of chemical/mechanical/biological dewatering sewage treatment systems using sulfur dioxide and provides the following advantages:

Water Savings

One advantage of the hybrid chemical/mechanical dewatering sewage treatment apparatus for wastewaters is its reduced process water loss. Chemically dewatered sludge processes are much faster than conventional mechanical dewatering systems so evaporation losses are reduced. Conventional mechanical concentration systems are most successful in areas where the excess wastewater is evaporated into the atmosphere in hotter more arid regions. Unfortunately, this evaporative consumptive use of water in arid regions is now becoming a conservation issue. Presently on the Jordan River system in Salt Lake City, Utah, various sewage treatment plants are seeking to claim water rights to the treated waters exiting their plants and divert and sell the same to different water drainages to off-set costs. These water right claims for the first time in Utah will indirectly establish the cost of evaporative consumptive use of water related to sewage treatment operations so that evaporated lost water now becomes a cost of operations. Not only is water lost through evaporation, but the high water content in the land filled sewage must also be factored in. Hence, future mechanical concentration wastewater treatment systems must factor in the lost process water consumption as a cost in evaluating the best sewage treatment mode as the volume entering the plant and leaving the plant is easily quantifiable and affects future water right claims.

The additional water generated from the hybrid chemical/mechanically dewatering sewage treatment apparatus often provides a significant amount of additional water, while maintaining the same treated water output for downriver users and habitat enhancements. This avoids plant operating dictates from downriver users who have vested rights to existing treatment water outflows.

Eutrophication

Other environmental clean-up advantages may be factored in employing the sulfur dioxide chemical/mechanical/biological dewatering system, such as minimizing stream eutrophication causing algae bloom. Present mechanical concentration methods have focused on banning phosphate detergent usage, and removing phosphates from farm, and industrial sources entering wastewater streams before discharge to prevent eutrophication. These phosphate removal costs are significant, and fail to factor in the eutrophication impacts of heavy metals. The Swedish Phosphate Report concluded that removal of phosphates from detergents was pointless and ill advised. Water pollution was a far more complex problem than early environmental activists had assumed and it was proven to depend on a variety of factors, among which phosphate was perhaps one of the least important. The main cause was demonstrated to be industrial pollution by heavy metals, oils and insecticides, as all these substances kill the zooplankton that feed on the algae causing the problem; see *The 13$^{th}$ Element*, by John Emsley, John Wiley & Sons, 2000, at page 273, Chapter "Oh shit". The removal of heavy metals and some phosphates by the algae in the hybrid chemical, mechanical, biological dewatering system thus results in significant environmental benefits.

Separated Solids Fuel

Most mechanical dewatering methods generally produce sludge with high 30-40% water content as outlined above. This high water content prevents direct burning. These mechanically dewatered high water content sludges are admixed with fuels, such as coal, for burning or gasification because of the high water content. Alternatively, they must first be further dewatered via drying beds and dryers, which add to the processing costs. Generally, it has been found that these mechanical dewatered sludges seldom have enough independent fuel value for usage on-site by smaller facilities and must be disposed of using other methods, such as land filling or admixing with other fuels for burning.

Conversely, chemically dewatered sludge produced by injecting either gaseous $SO_2$ or aqueous $SO_2$ (sulfurous acid) provide solids with low water content and a relatively high BTU low sulfur concentrated fuel suitable for burning or gasification to produce heat, electricity, or other forms of useful energy, such as steam. The sulfur dioxide dewatering method produces a fuel with a fairly consistent BTU content dependent upon the raw product composition. For example, one chemically treated and separated sludge generated near Logan, Utah produced a chemically dewatered densified fuel having a BTU content similar to wood of between approximately 7,040 BTU/lb. ASTM (American Society Testing Method) 02382 and 7,290 BTU/lb. ASTM 02382. Initial separation took place in one half hour after injection of gaseous $SO_2$ having an initial 30% to 40% moisture content. If allowed to continue to completely dry over a 24 hour period, a moisture content of 4% to 6% was achieved. This chemically dewatered sludge had the appearance, and texture similar to dark dry wood. It was essentially odorless with a moisture content of between 4% and 6%. It had a high cellulose solid content of between 94% and 96% similar to wood making them readily transportable and storable until burned or gasified. This dry wood like sludge had approximately 1.8% by weight $SO_2$ emissions, when burned, which is comparable to those produced by low sulfur coal. Depending upon the fat content of the solids in the wastewater, the treated solids may have even a higher BTU content than wood. Consequently, the by-product fuel of chemically dewatered concentrated sludge may be burned directly, and/or admixed with the mechanically separated sludge for burning or gasification.

Algae

The nutrient rich conditioned wastewater may be used to raise algae, duckweed and other photo biomass, hereinafter all referred to as algae. This photo biomass is periodically harvested, and provides a Biofuel feedstock, or may be used for cosmetics, or other uses.

Soil Conditioning

In arid regions where alkaline soils are often found, the hybrid chemical and mechanical dewatering method for optimizing sewage treatment plants may generate acidified wastewater discharge to provide soil conditioning benefits, which reduce nutrient and water agricultural demands by making the soil more porous. In addition, instead of removing chemicals via competing membrane technologies, a balanced chemical composition is generated with this hybrid chemical/mechanical dewatering of wastewater method to grow algae, thus providing, an additional revenue source for this land conditioning method.

Community Preferences

Intangible aesthetic factors often drive the selection of a sewage treatment technology in those areas abutting urban development. The package chemical dewatering method meets community preference values in terms of added benefits or costs odor suppression, removal of heavy metals, pathogen kill, and reduced plant size. Although these aesthetic factors are often subjective, they are often the controlling factors in mandating wastewater treatment design.

Plant Security

The reduced chemical dewatering wastewater treatment plant footprint enables better plant security as there is less to protect. The employment of mobile units, which can readily be replaced and moved, also provides better response time in the event of a disaster or incident. Also, emergency flooding can be anticipated and the treatment plant location varied to avoid flooding of large settling lagoons and the resultant contamination to the surrounding areas.

Apparatus

The apparatus comprises a source of sulfur dioxide associated with injection means to supersaturate wastewater influent containing solids with sulfur dioxide to rapidly condition and disinfect the wastewater in an enclosed vessel or container to prevent operator exposure and contain excess sulfur dioxide. The enclosed vessel or container is partially filled, such that the excess sulfur dioxide forms sulfurous acid, ($H_2SO_3$), which dissociates as discussed above to produce large amounts of free $SO_2$ in solution and the unfilled air space in enclosed vessel or container. The high levels of free $SO_2$ in the wastewater and the atmosphere above it are maintained within the enclosed container at a pressure and level selected to raise the levels of free $SO_2$ in solution to reduce dwell time therein and rapidly disinfect the wastewater and solids.

After disinfection, vacuum means are associated with the enclosed vessel or container to create negative pressure within the air space in the enclosed vessel or container evacuate such that excess free $SO_2$ in the atmosphere above the chemically treated wastewater is withdrawn and collected for re-injection into the incoming wastewater. A supplemental supply of sulfur dioxide is then co-mixed with the vacuum removed excess sulfur dioxide and injecting into incoming raw influent under saturated $SO_2$ conditions to continually effectuate supersaturated wastewater entering the treatment zone.

The chemically treated wastewater is then passed through solids separation means to remove solids and provide liquids for pH adjustment and inactivation of any excess sulfur dioxide before land application or growing photo biomass.

Bottled $SO_2$ may be employed to provide the supply of anhydrous sulfur dioxide. Alternatively, raw sulfur may be burned to produce onsite the $SO_2$ as needed. A typical skid mounted sulfur generator producing hydrous sulfur dioxide such as those currently produced by Harmon Systems International, LLC of Bakersfield, Calif. are employed to simultaneously generate anhydrous sulfur dioxide for gas injection and mixing with an injector. Sulfur burners also have the advantage of minimizing $SO_2$ release from explosion in the event of terrorist attack of the wastewater treatment plant.

Thus a typical installation includes an enclosed reaction vessel, (covered batch reactors or an inline reactor, such as a pipe or flow through vessel), which is in communication with the wastewater inflow streams. A mixer is mounted within the reaction vessel and is associated with the supply of sulfur dioxide or a sulfur generator for chemically injecting and admixing a supersaturated amount of sulfur dioxide into the wastewater inflows until the solids agglomerate and separate from the liquid fraction of the wastewater. The reaction vessel is sized and structured to provide the desired dwell time for effectuating rapid disinfection and an initial solids/liquid separation by the sulfur dioxide of the treated wastewater. Where slurry transport is employed, minimal dwell time is required as discussed above so that the majority of the chemical dewatering occurs in the drying beds or mechanical separators.

In one embodiment, the wastewater transport inflow pipes themselves are used as a reaction vessel treatment zone for injected bottled $SO_2$. The pipe segment required for this sulfur dioxide treatment must be acid resistant to the acidified sulfur dioxide-treated wastewater. If not, an acid resistant extender made of stainless steel or polypropylene or similar acid resistant material is attached to the end of the transport inflow pipes. The length and diameter of the inflow pipe segment required for treatment is selected to allow sufficient dwell time therein after sulfur dioxide injection to effectuate the initial desired solid/liquid wastewater separation. If disinfected solids/liquid wastewater is required, the reaction zone is sized to provide an approximate 10 to 20-minute dwell time at approximately a pH 2 or lower until total disinfection is achieved.

At least one drain pad is positioned and structured to collect and drain the solids from the sulfur dioxide-treated wastewater. These drain pads are constructed of an acid resistant material such as stainless steel, acid resistant cement or propylene liners. They have a large drying surfaces, which may be made of mesh or include drain holes or channels to direct the draining shedded water to a point of collection for disposal. The mesh or holes may be covered with a filtration cloth, such as a cotton or polypropylene acid resistant fiber sheeting, to aid in separating the solids. Cotton sheets have the advantage of not having to be removed before burning the dried solids as their air emissions from burning are approximately the same as the dried solids.

The drain pads are structured to hold the separated solids until the desired chemical dewatering has occurred. Complete drying takes approximately 24 hours. However, a shorter drying time to produce solids with a higher water content for burning is often employed to provide a fuel with a higher water content for better combustion. Usually, a series of drain pads are included so that at least one is being filled, while the others are draining the solids. Once the solids have drained sufficiently, they are removed via a front-end loader scraper and trucked for disposal. Preferably these drain pads are movable or rapidly constructed so that in the event of a flood emergency they may be relocated to higher ground.

The dried solids are then removed and disposed of with disposal means such as scrapers and loaders filling trucks for hauling the treated solids to a landfill. Alternatively, as the dried solids generally have a BTU content similar to wood, they may also be burned or gasified as a fuel. A mobile gasifier or boiler and electrical generator set, such as those produced by Thermogenics, Inc. of Albuquerque, N. Mex. may be employed for this purpose, or the solids transported to a more permanent stick built gasifier or electric generator for admixing with other fuels such as a fluidized coal bed electrical generator.

For those communities requiring covered solids containment, the sulfur dioxide-treated wastewater may be passed into an acid resistant porous bag placed on the drain pad. These drain bags have a mesh sized to collect and separate the treated solids from the treated wastewater drains through the drain bag onto the drain pad and into a collection system associated with the drain pads. The filled drain bag is then disposed of generally via landfill, or burned or gasified. Polypropylene bags such as those produced by Miratech a division of Ten Cate Nicolon of Pendergrass, Ga. provide a bag, which is acid resistant, and prevents bird vector transport of the solids. Depending upon the air emissions standards, these drain bags may or may not have to be separated from the dried sludge solids contained therein before burning or gasification.

The chemically separated dried solids, when completely dry, have a moisture content comparable to wood (approximately 4%). For burning, these chemically dried solids are admixed with conventional separated solids with higher moisture content of approximately 30-40% in a ratio to provide a combined fuel with an overall moisture content of approximately 20%.

Where plant security is an issue, the sulfur dioxide is preferably generated as needed by employing sulfur burners which burn raw sulfur only as needed; thereby minimizing exposure from accidental $SO_2$ chemical release.

The treated wastewater may be land applied particularly in areas of alkaline soils where acidified water is required for soil conditioning. If the heavy metals acid leached from the treated solids are too high for land application, these heavy metals in the treated wastewater may be removed by alkaline precipitation of the metals therein as metal hydroxides. These metal hydroxides are then removed via settling or filtration via belt presses or polypropylene bags with an appropriate mesh size.

In other applications, this acidified treated wastewater may be used for recharging the groundwater via soil aquifer treatment.

The screened sulfurous acid wastewater filtrate is then pH adjusted to reduce the biocidal properties of the free $SO_2$ and bi-sulfites/sulfites in the wastewater by raising the pH with dry or hydrated lime to provide the pH required for subsequent environmental biological algae treatment, or to raise plants.

The screened pH adjusted $SO_2$/Sulfurous acid/bi-sulfite/sulfite filtrate of the wastewater inflows are high in dissolved solids and nutrients including ammonia, phosphorous, and nitrates in solution promoting rapid bacterial, algae, and plant growth, which can be measured by its high BOD value.

If land applied, the calcium added lowers the Sodium Adsorption Ratio (SAR) and off-sets any sodium accumulation allowing the $SO_2$/sulfurous acid/bi-sulfite/sulfite treated wastewater to be safely applied to a wider range of soils including alkaline and high pH soils and to maintain and/or improve their existing soil fertility. Thus, by utilizing it for its-high calcium content, ammonia and plant nutrients, ability to lower the pH of alkaline soil by delivering additional acidity into the soil, and for its properties to reduce and suppress soil pathogens, etc., allows this type of water to be utilized for its ability to act as a soil amendment and to be a source of valuable plant nutrients, making this method and the conditioned wastewater it produces ideally suited for the propagation of suitable crops (where and whenever its use is allowed), as the primary biological means to utilize and remove these constituents, as claimed and disclosed in U.S. Pat. No. 7,566, 400 issued Jul. 28, 2009, Harmon et al, entitled "Wastewater Chemical/Biological Treatment Method and Apparatus, Ser. No. 12/286,083 filed Sep. 26, 2008. Alternatively, as the flow of treated wastewater nutrients is consistent it is particularly suited for aquaculture to raise aquatic plants, algae, and other microorganisms.

If heavy metals are present in detrimental amounts in the filtered $SO_2$ treated liquid fraction, the treated wastewater pH can first be raised to precipitate and separate out the heavy metals contained in the wastewater resulting in metal free filtrate. Ideally, this process is conducted prior to subsequent biosolids consolidation. A pH of up to 11 will precipitate all of the heavy metals as metal hydroxides. If there are heavy metal hydroxides, which become more soluble at higher pH levels, they are sequentially removed with filtration. For example, at higher pH levels, chromium and possibly iron and aluminum become more soluble as $Fe(OH)_4^-$ or $Al(OH)_4^-$ or $Cr(OH)_4^-$ ions. They therefore are removed at the pH at which they precipitate before the pH is then raised higher to remove other heavy metal hydroxides.

The final high pH is then acid reduced for environmental biological plant or algae treatment—usually to a pH range of approximately 6 to approximately 8. Other factors in the selection of this pH are the soil alkalinity in a region, and whether the treated wastewater will be land applied or discharged to an aqueous environment.

The high pH around 11 causes ammonia to separate into a gas for possible removal through scrubbing where the ammonia level in the acid treated wastewater is too high for secondary recovery water re-usage. However, for most $SO_2$ treated wastewaters, the biological removal of ammonia via plant and photo biomass consumption is sufficient.

The demetalized chemically treated water is then land applied, used to propagate aqueous photo biomass, duckweed, or algae, or sold to and end user. Alternatively, the demetalized chemically treated water is disposed of by draining into streams or lakes to dilute heavy metal concentration in the water to minimize eutrophication.

SUMMARY

The method and apparatus reduces the footprint and operating costs of sulfur dioxide treatment to chemically treat wastewater by first supersaturating influent with excess sulfur dioxide until rapid disinfection is achieved, and then vacuum removing the surplus free $SO_2$ for re-injection into the intake wastewater; thereby reducing the amount of additional sulfur dioxide required to continually supersaturate intake wastewater for rapid disinfection. This also reduces the amount of chemicals to inactivate and raise the pH of the treated disinfected effluent for land application or raising photo biomass.

DESCRIPTION OF THE ILLUSTRATED EMBODIMENTS

Figure 1:
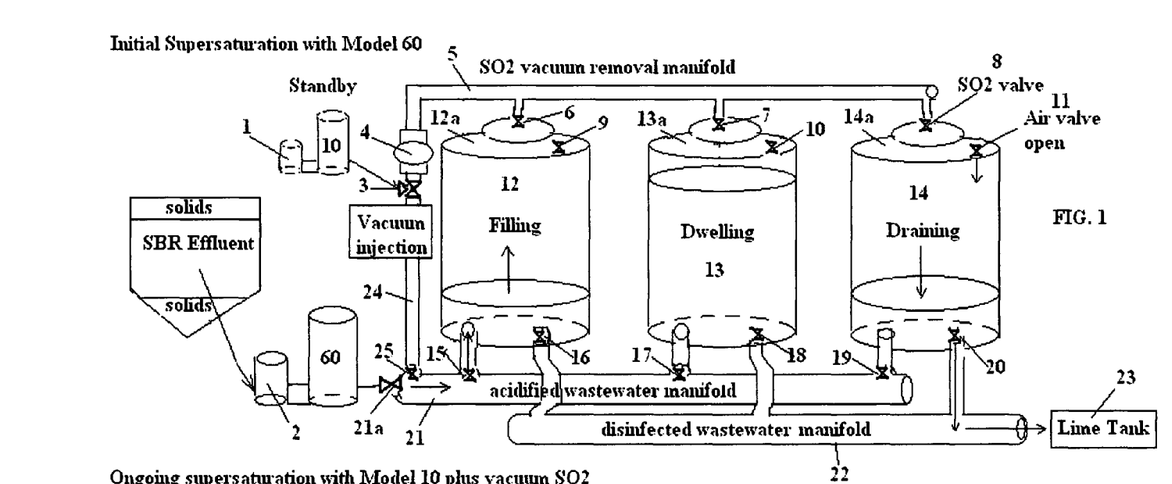
FIG. 1 illustrates a dual sulfur generator layout of the rapid chemical dewatering method in initial super saturation mode.

FIG. 1 illustrates a typical dual sulfur generator layout of a rapid chemical dewatering method in an initial super saturation mode. Two sulfurous acid generators 1, 2 are associated as part of a circuit to alternatively treat effluent from a sequential batch reactor (SBR). The larger is a Model 60 Harmon Systems International sulfurous acid generator 2 capable of treating ½ MGD burning 75 pounds sulfur/hour, which first is used to supersaturate the SBR effluent, which enters an acidified wastewater manifold 21 controlled by a valve 21a, which then sequentially fills three enclosed 20,000 gallon treatment tanks, 12, 13, 14. The three tanks 12, 13, 14 are sequentially filled within a short distance from their enclosed tops 12a, 13a, 14a, leaving an air space wherein excess sulfur dioxide gas accumulates and is concentrated. These tank tops 12a, 13a, 14a have air valves 9, 10, and 11 and $SO_2$ removal valves 6, 7, 8. The air valves 9, 10, 11 are in communication with the atmosphere to selectively allow air into the treatment tanks 12, 13, 14 to assist in their draining. The $SO_2$ removal valves 6, 7, 8 are associated with an $SO_2$ vacuum removal manifold 5 to selectively fill said manifold 5 with surplus $SO_2$ gas when the respective $SO_2$ removal valves 6,7,8 are opened. The first tank 12 is filled by the manifold 21, which selectively opens fill valve 15 so tank 12 fills. Initially, the three tanks 12, 13, 14 are sequentially filled as shown with air valves 9, 10, and 11 and $SO_2$ removal valves 6, 7, 8 closed until each tank is to be drained.

As one tank is drained, the next tank is then filled by opening the associated fill valve 15, 17, 19 in the same manner described above. The filled tank is then allowed to dwell for the time required for disinfection, while the third tank is being filled and the first tank is drained. When all three tanks 12, 13, 14 have been selectively filled/dwelled/drained with acidified SBR effluent provided by the larger sulfurous acid generator 2 so that the entire system contains supersaturated acidified effluent and surplus sulfur dioxide, valve 21a connecting the larger sulfurous acid generator 2 is shut, and the tanks 12, 13, 14 are then filled and emptied as shown in FIG. 2.

Figure 2:
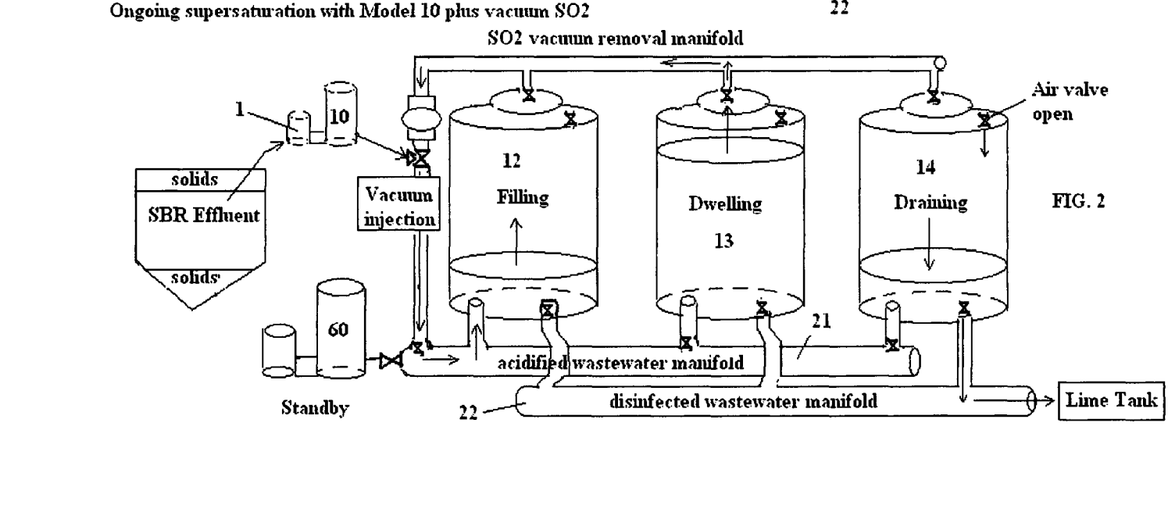
FIG. 2 illustrates a preferred dual sulfur generator layout of the chemical dewatering method ongoing super saturation mode employing vacuum removal.

FIG. 2 illustrates the recovery of surplus sulfur dioxide from the three tanks 12, 13, 14, which is combined with sulfurous acidified SBR effluent provided by a smaller Model 10 Harmon Systems International sulfurous acid generator 1 capable of treating ½ MGD at a much lower concentration (10-12 lbs sulfur/hour). The vacuum recaptured surplus sulfur dioxide co-saturates the SBR effluent with the excess sulfur dioxide removed by an $SO_2$ vacuum removal manifold 5 via a vacuum pump 4. The acidified SBR effluent from the smaller sulfurous acid generator 1 is fed through a three way valve 3, which is blended with the surplus sulfur dioxide and then enters a connecting conduit 24 leading into a feed valve 25 leading into the acidified wastewater manifold 21 to selectively fill tanks 12, 13, 14.

The respective three treatment tanks 12, 13, 14 are then selectively sequentially filled with one of the fill valves 15, 16, 17 selectively opened for filling and the others closed for dwelling and draining. Before draining a tank, the $SO_2$ removal valve associated with a given tank is opened for surplus sulfur dioxide removal via the $SO_2$ vacuum removal manifold 5. A vacuum pump 4 is operably associated with the vacuum removal manifold 5 to remove surplus $SO_2$ from the dwell tank and deposit it into the manifold 5. SO2 removal typically takes 5 to 20 minutes, depending upon the strength of the vacuum and vessel configuration. After the surplus $SO_2$ is removed from the dwelling tank, the SO2 removal valves 6, 7, 8 are closed and the tank's associated air valve 9, 10, 11 is then opened, allowing the tank to drain into the disinfected wastewater manifold 22 leading into a liming tank 23 for pH adjustment.

An automated controller (not shown) selectively opens and closes the $SO_2$ removal valves 6, 7, 8, the air valves 9, 10, 11, the tank drain valves 16, 18, 20, and the tank fill valves 15, 17, 19 so that the tanks 12, 13, 14 are sequentially filled according to the described filling/dwelling/draining sequence to maintain supersaturated acidification with shortened dwell times, and excess sulfur dioxide removal. An $SO_2$ concentration sensor (not shown) may be associated with the acidified wastewater manifold to send a signal to the automated controller that the $SO_2$ wastewater levels are dropping below the level required for rapid disinfection. The automated controller also controls the sulfurous acid generators 1, 2 and the three-way valve 3 and valves 21*a*, and 25 so that the larger generator 2 may be selectively activated to again supersaturate the wastewater treatment system in the event higher sulfur dioxide super saturation conditions need to be reestablished.

By supersaturating the SBR effluent, rapid disinfection occurs; thereby reducing the dwell time required and consequently the size of the treatment vessels or containers. After disinfection, the surplus sulfur dioxide is removed from the disinfected wastewater and reused reducing the amount of sulfur needed and lime required to pH adjust and inactivate unreacted sulfur dioxide.

Figure 3:
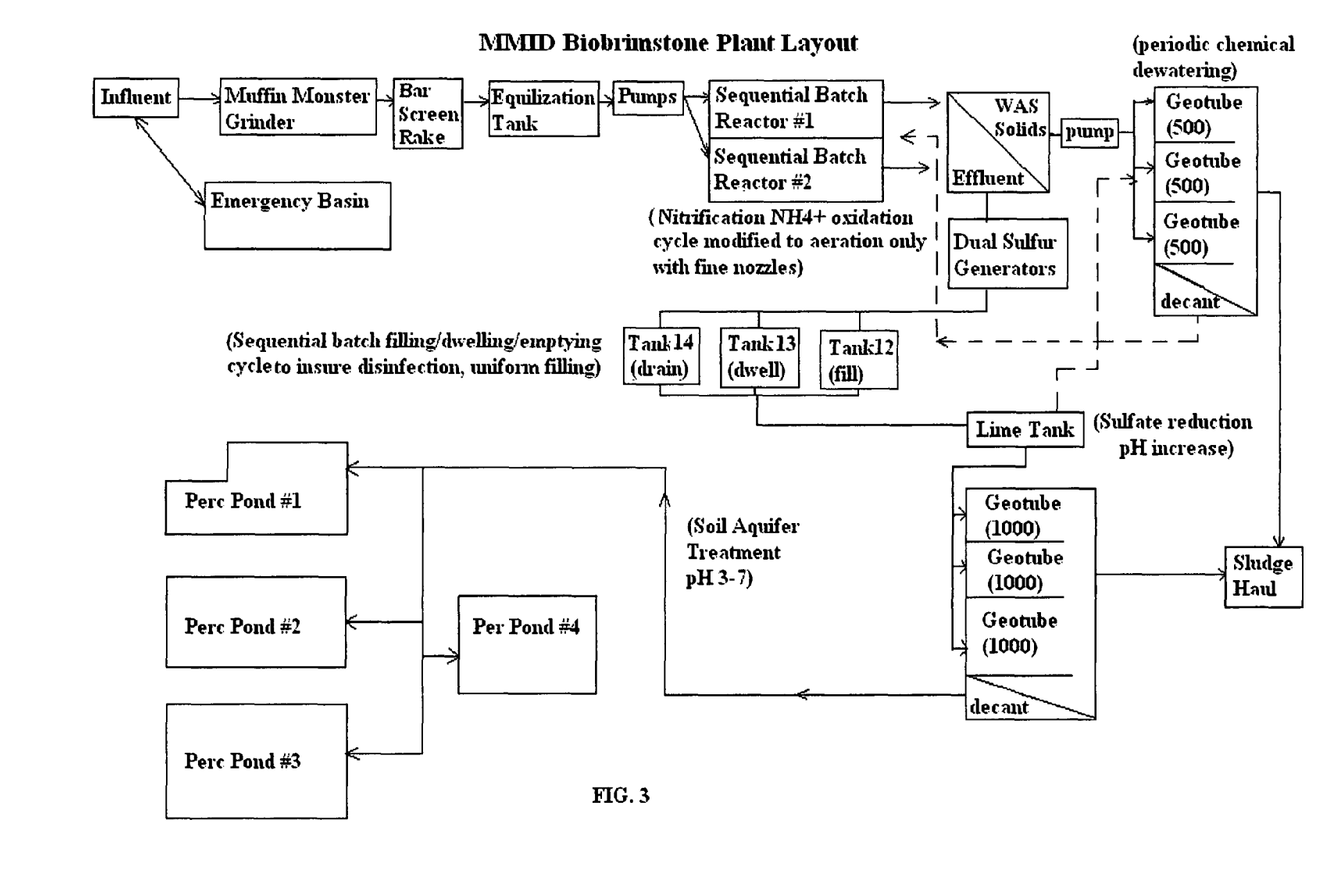
FIG. 3 illustrates a preferred layout of the chemical dewatering equipment retrofitting the MMID wastewater treatment plant.

FIG. 3 illustrates a layout of the chemical dewatering equipment retrofitting the MMID wastewater treatment plant. The influent wastewater inflows are ground with a muffin monster grinder and then screened with bar screens before entering an equalization tank to normalize intake flows. From the equalization tank, the ground influent is sent to two batch reactors as shown. The effluent from the sequential batch reactors are then sent to the dual sulfur burners 1, 2 of FIGS. 1 and 2 for sequential batch treatment as described above. The acidified disinfected treated effluent is then pH adjusted in a lime tank and passed through woven polyethylene bags to separate the solids from the liquids, which are sent to percolation ponds for soil aquifer treatment. These separation bags separate and hold the solids, while allowing the treated wastewater to continue to drain forming a decant, which is sent back to the sequential batch reactors. These separation bags separate and hold the solids for further chemical dewatering in the bag up to 1 to 4% water by weight. The separation bags also prevent access by birds and other animals while hiding from view the drying solids. When the solids are drained, the filled separation bags are removed for hauling and land filling or burning.

Figure 4:
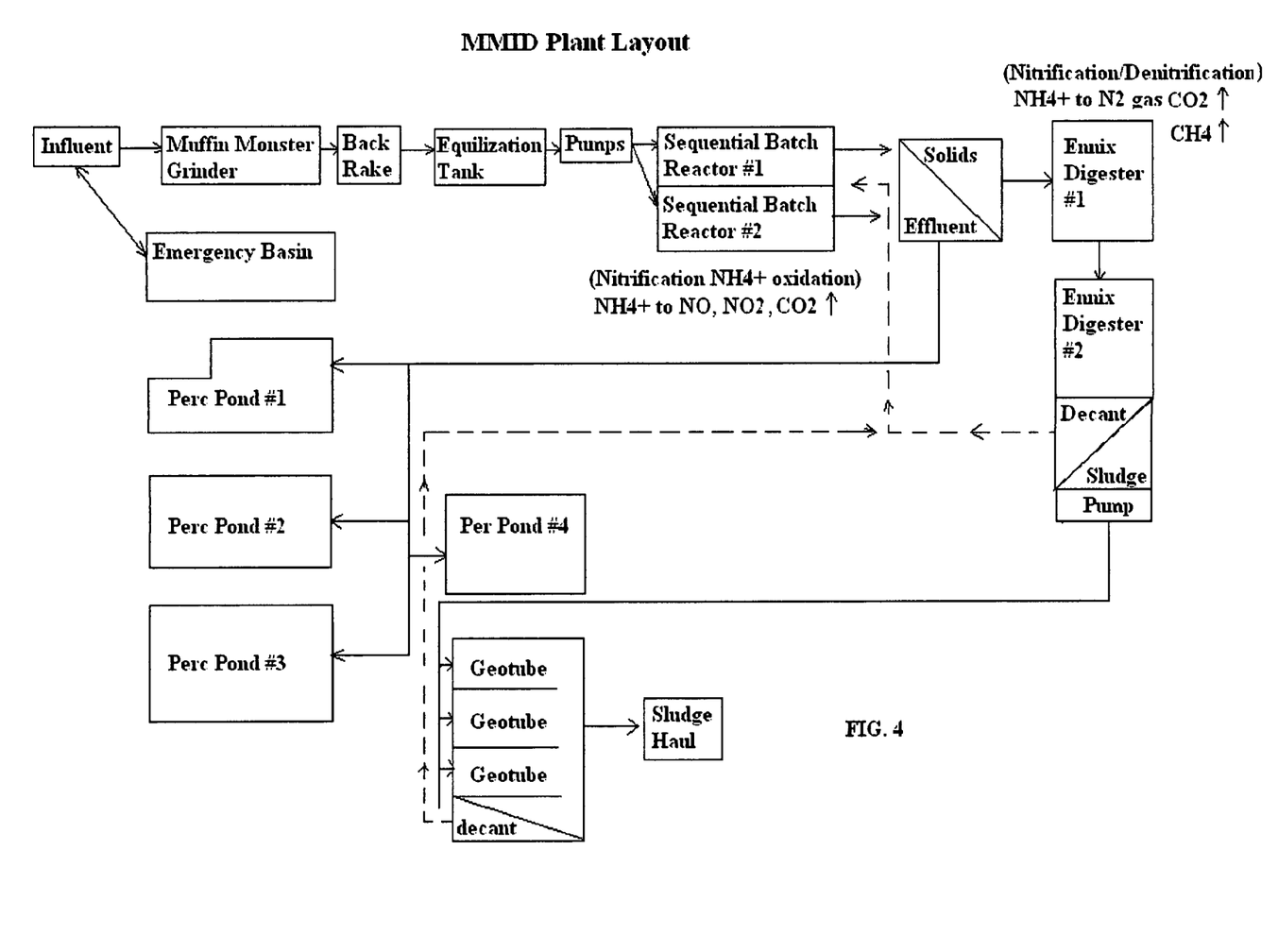
FIG. 4 illustrates the layout of the existing MMID wastewater treatment plant.

FIG. 4 illustrates the layout of the existing MMID wastewater treatment plant employing twin SBR's and twin Ennix Digesters. The twin SBR's have low mean cell retention time (approximately 4 hours) nitrifying only $NH_4^+$ by oxidation, and the twin Ennix Digesters with a higher mean retention time (30 to 40 days) converting $NH_4^+$ to $N_2$ gas in a nitrification/denitrification cycle, which produce significant $CO_2$, $CH_4$ greenhouse gases; see article "Comparative Energy-and Carbon-Footprints for Activated Sludge Layouts by Professor Diego Rosso, U C Irvine and Professor Michael K. Stenstrom, UCLA copyrighted in 2008. These twin SBR's are modified in the FIG. 3 layout to only aerate the influent for the time required for virus control with fine nozzles to minimize air emissions; thereby reducing greenhouse gas emissions. Further, the twin Ennix Digesters are completely shut down in the FIG. 3 layout, preventing the production of green house gases from this operation. Thus, the overall carbon footprint of the FIG. 3 layout employing rapid disinfection and inactivation of aerobic and anaerobic bacteria with sulfur dioxide therefore significantly reduces the present carbon footprint of the MMID wastewater treatment facility.

In summary, the invention provides a sulfur dioxide chemical/mechanical/biological sewage treatment plant and method with a smaller physical and carbon footprint utilizing minimal chemicals for sludge chemical dewatering and recovered water for raising plants and photo biomass to meet cost, environmental permitting restrictions and other siting and permitting limitations for disposal of sewage and wastewater.

Although this specification has made reference to the illustrated embodiments, it is not intended to restrict the scope of the claims. The claims themselves recite those features deemed essential to the invention.

We claim:

1. A method for reducing the footprint of chemical/mechanical/biological wastewater treatment facilities employing sulfur dioxide for disinfection and chemical dewatering of solids in conjunction with an environmental biological treatment system comprising:
    a. injecting sufficient sulfur dioxide into the wastewater inflow streams to acidify and supersaturate the wastewater inflow streams with sufficient free $SO_2$ for disinfection,
    b. transferring the acidified supersaturated wastewater inflow streams into at least one enclosed reaction vessel or reaction zone to contain any surplus $SO_2$,
    c. holding the acidified, supersaturated wastewater under positive pressure for a dwell period until the solids sufficiently agglomerate and separate from the liquid fraction, and disinfection of the wastewater solids and liquid fractions occurs forming a disinfected wastewater,
    d. applying negative pressure to remove after disinfection surplus $SO_2$ from the enclosed reaction vessel or reaction zone and supersaturated disinfected wastewater before draining for re-injection into incoming wastewater inflow streams to offset and reduce the amount of additional $SO_2$ required to maintain superstaturation conditions,
    e. filtering the solids from the sulfur dioxide-treated wastewater for solids disposal or capture to hold the separated solids until the desired chemical dewatering has occurred, and
    f. neutralizing the sulfur dioxide-treated wastewater land to pH adjust and inactivate any remaining $SO_2$ before land application, raising photo biomass, or groundwater recharge.

* * * * *

UNITED STATES PATENT AND TRADEMARK OFFICE
CERTIFICATE OF CORRECTION

| | | |
|---|---|---|
| PATENT NO. | : 7,867,398 B2 | Page 1 of 1 |
| APPLICATION NO. | : 12/798088 | |
| DATED | : January 11, 2011 | |
| INVENTOR(S) | : John Harmon, Marcus G. Theodore and Larry P. Wardle | |

It is certified that error appears in the above-identified patent and that said Letters Patent is hereby corrected as shown below:

Column 18, line 48 of Claim 1, should read as follows:

f. neutralizing the sulfur dioxide-treated wastewater to pH adjust and inactivate any remaining SO2 before land application, raising photo biomass, or groundwater recharge.

Signed and Sealed this
First Day of March, 2011

David J. Kappos
*Director of the United States Patent and Trademark Office*